Mud level falling - Vacuum increased

Mud level rising - Vacuum decreased

United States Patent Office 3,363,404
Patented Jan. 16, 1968

3,363,404
MUD DEGASSERS
Phil H. Griffin III, Fort Worth, Tex., and John W. Melton, Jr., Lafayette, La., assignors, by mesne assignments, to Swaco, Inc., Fort Worth, Tex., a corporation of Texas
Continuation-in-part of application Ser. No. 308,314, now Patent No. 3,241,295, Mar. 22, 1966, which application is a continuation-in-part of application Ser. No. 37,685, June 21, 1960. This application Oct. 6, 1964, Ser. No. 401,913
3 Claims. (Cl. 55—170)

ABSTRACT OF THE DISCLOSURE

The present application discloses drilling mud degassing apparatus, the combination of a horizontally elongated vacuum tank having an inlet end and an outlet end, an intake pipe for gas cut mud extending into the inlet end of said tank, an outlet pipe for gas free mud extending from the bottom portion of the tank outwardly through the outlet end thereof for recirculation of gas free mud to a well, a vacuum pump, a suction line extending from said pump, a three-way vacuum control valve having a first port connected to said suction line, a second port, and port means communicating with the atmosphere, a suction pipe extending from said second port of said valve to the interior of said tank, a float buoyant on the level of mud in the bottom portion of the tank, and means operatively connecting said float to said control valve whereby the valve may directly communicate said suction pipe to said suction line and pump to increase the vacuum in the tank when the mud level is falling and whereby the valve may communicate said suction pipe through said port means with the atmosphere to decrease the vacuum in the tank when the mud level rises.

---

The present application is a continuation-in-part of our application Ser. No. 308,314, now Patent No. 3,241,295, dated Mar. 22, 1966, which application is a continuation-in-part of our application Ser. No. 37,685, filed June 21, 1960, now abandoned.

This invention relates to new and useful improvements in drilling mud de-gassers for oil wells, and the principal object of the invention is to facilitate simple and highly efficient removal of gas from gas cut mud for recirculation of gas free mud to the well.

In accordance with the invention, gas cut mud is passed into a horizontally elongated vacuum tank, such as shown in Erwin Patents Nos. 2,748,884 and 2,869,673 where it is permitted to cascade over baffle plates, the vacuum in the tank effectively withdrawing all gases from the mud and the gas free mud collecting in the bottom of the tank from where it is withdrawn and recirculated to the well. The vacuum in the tank is accurately controlled by improved three way valve means which are automatically responsive to raising and lowering of the mud level in the bottom of the tank so that the vacuum is increased when the mud level falls and is decreased when it rises.

Other objects, features and advantages of the invention may become apparent from the following description taken in conjunction with the accompanying drawings, wherein like characters of reference are used to designate like parts, and wherein.

Figure 1:
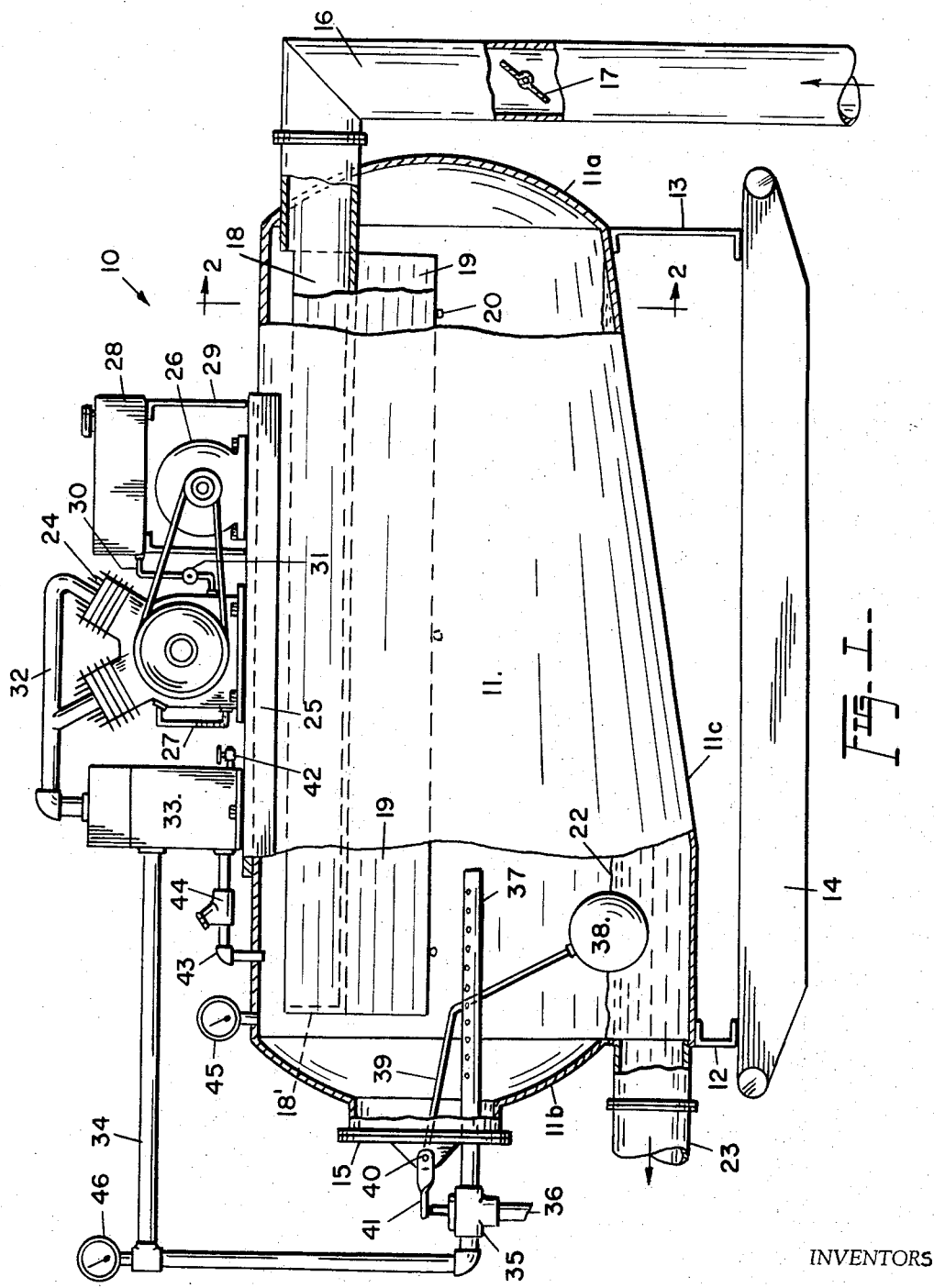
FIGURE 1 is a view, partly in side elevation and partly in longitudinal vertical section, of the mud de-gasser of the invention.

Referring now to the accompanying drawings in detail, the drilling mud de-gasser of the invention is illustratively embodied in Erwin Patent No. 2,869,673, is designated generally by the reference numeral 10 and comprises a horizontally elongated vacuum tank 11 mounted by suitable supports 12, 13 on a base, platform or skid 14. The tank has an inlet end 11a, an outlet end 11b and a sloping bottom 11c which slants downwardly from the inlet to the outlet end of the tank. A removable cover 15 is provided on the outlet end 11b so that access to the tank interior may be had for purposes of inspection and cleaning.

An intake pipe 16 delivers gas cut mud from the well to the tank and is provided with a manually set throttle valve 17 so that the flow of mud into the tank may be regulated. The intake pipe 16 extends through the inlet end 11a and communicates with a trough 18 which extends longitudinally centrally in the upper portion of the tank for almost the full length of the latter and is closed at the end 18' thereof. Conveniently, the trough 18 may be formed by extending the intake pipe 16 into the tank and cutting away the top portion of the pipe. A pair of downwardly divergent cascade plates or baffle plates 19 are secured at their upper edges to the opposite sides of the trough 18, the lower edges of these plates being suitably supported, as by pins 20 on the inside of the tank, thus also serving to support the trough 18 in position.

Figure 2:
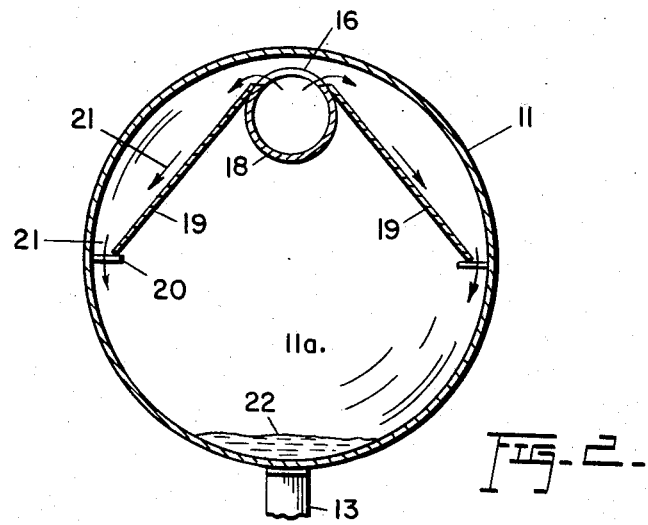
FIGURE 2 is a fragmentary cross-sectional view, taken substantially in the plane of the line 2—2 in FIGURE 1.

It will be apparent that gas cut mud passing through the intake pipe 16 into the trough 18 will overflow from the trough onto the baffle plates 19 and will cascade over the baffle plates as indicated by the arrows 21 in FIGURE 2. The interior of the tank is maintained at sub-atmospheric pressure by means hereinafter described, and the vacuum in the tank effectively withdraws all gases from the mud as the latter cascades over the baffle plates. The flowing mud drops off of the plates 19 onto the sides of the tank and gravitates along the sides to the bottom portion of the tank where it maintains a varying level indicated at 22. Whatever gases still remain in the mud after cascading over the plates 19 are removed by the vacuum during gravitation of the mud along the sides of the tank, so that gas free mud collects on the tank bottom from where it passes through a suitable outlet pipe 23 for recirculation to the well. Any suitable means (not shown), such as a centrifugal pump as disclosed in our patent No. 3,241,295, a positive displacement pump, or a jet stream, as disclosed in Erwin Patents Nos. 2,748,884 and 2,869,673, may be employed for inducing the flow of mud through the tank.

Sub-atmospheric pressure in the tank is produced by a vacuum pump 24 mounted on a platform 25 on top of the tank and driven by a motor 26 also mounted on the platform. The crankcase of the pump 24 is preferably provided with a sight glass or gauge 27 to indicate the oil level therein. An oil reservoir 28 is mounted by suitable legs 29 on the platform 25 and an oil supply line 30, equipped with a manual control valve 31, extends from the oil reservoir to the crankcase of the pump 24 so that oil may be added to the crankcase as required for proper lubrication.

The pump 24, of course, exhausts to the atmosphere while the intake manifold 32 of the pump is connected to a conventional float-actuated liquid trap 33, also mounted on the platform 25. A gas suction line 34 extends from the trap 33 to a vacuum control valve 35, the latter having port means 36 open to the atmosphere and also having a suction pipe 37 which extends into and communicates with the interior of the vacuum tank. Preferably, the pipe 37 passes through the removable cover 15, so that it may be removed with the cover for inspection or cleaning.

The control valve 35 is automatically operated by a float 38 in response to rising or falling of the mud level 22 in the tank. The float 38 is carried by an arm 39 pivotally mounted as at 40 inside of the cover 15, the pivot 40 projecting to the outside of the cover and carrying a link 41 which operatively engages the valve 35 in any suitable manner, it being understood that the valve 41 itself is of any suitable conventional construction.

Figure 3:
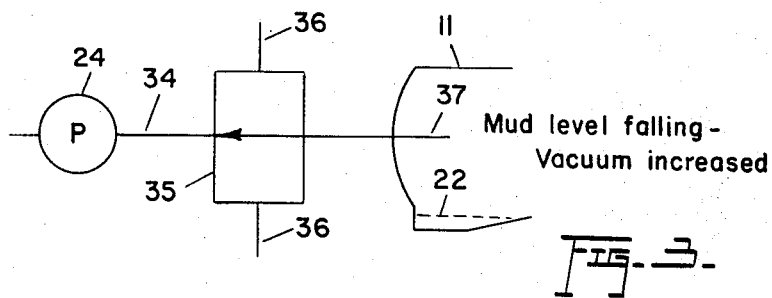
FIGURES 3 and 4 are diagrammatic illustrations of the vacuum controlling operation of the invention.
Figure 4:
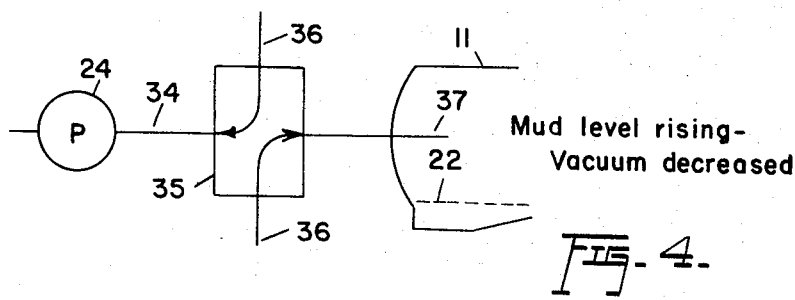

As is diagrammatically shown in FIGURE 3, when the mud level 22 in the tank 11 falls because the inflow of mud is not as great as the outflow, downward movement of the float 38 actuates the valve 35 so as to place the suction pipe 37 in direct communication with the suction line 34 of the pump 24, and the vacuum in the tank is increased. On the other hand, as shown in FIGURE 4, when the mud level rises, the float moves the valve 35 to a position in which the suction pipe 37 is communicated by the port means 36 to the atmosphere, thus permitting outside air to enter the tank and decrease the vacuum therein. Operation of the pump 24 may continue under such circumstances, with the pump simply drawing air from the atmosphere through the port means 36 of the valve, as will be apparent.

The purpose of the aforementioned trap 33 is to prevent liquids from entering the vacuum pump 24, the trap fulfilling this purpose by collecting and storing the undesired liquid which may be occasionally drained from the trap through a manual drain valve 42. If periodic draining of the trap is overlooked, an excessive amount of liquid in the trap will cause the float of the trap to close a valve (not shown) communicating with the suction line 34, thus preventing further formation of vacuum in the tank 11. In order to eliminate this disadvantage and to provide for automatic draining of the trap, a drain line 43 extends from the trap to the interior of the tank 11 and a check valve 44 is provided in the drain line, which permits liquid flow from the trap to the tank only. When the pump 24 is stopped, the vacuum in the line 34 will leak off more rapidly than the vacuum in the tank, and when this condition arises, the greater vacuum in the tank will cause liquid accumulated in the trap to flow through the check valve 44 into the tank, thus automatically draining the trap.

A vacuum gauge 45 is provided on the tank 11 and a similar gauge 46 is provided on the suction line 34 for determining the relative vacuum conditions existing therein.

While in the foregoing there has been described and shown the preferred embodiment of the invention, various modifications may become apparent to those skilled in the art to which the invention relates. Accordingly, it is not desired to limit the invention to this disclosure and various modifications and equivalents may be resorted to, falling within the spirit and scope of the invention as claimed.

What is claimed as new is:

1. In a drilling mud de-gassing apparatus, the combination of a horizontally elongated vacuum tank having an inlet end and an outlet end and a sloping bottom slanting downwardly from the inlet toward the outlet end, an intake pipe for gas cut mud extending into the inlet end of said tank, a horizontal trough extending longitudinally centrally in the upper portion of the tank and communicating with said intake pipe, a pair of downwardly divergent baffle plates extending from opposite sides of said trough toward the respective opposite sides of the tank whereby mud delivered into the trough may cascade over said baffle plates and gravitate along the sides of the tank to accumulate on the sloping bottom thereof, an outlet pipe for gas free mud extending from the bottom portion of the tank outwardly through the outlet end thereof for recirculation of gas free mud to a well, a vacuum pump, a suction line extending from said pump, a three-way vacuum control valve having a first port connected to said suction line, a second port, and port means communicating with the atmosphere, a suction pipe extending from said second port of said valve to the interior of said tank, a float buoyant on the level of mud in the bottom portion of the tank, and means operatively connecting said float to said control valve whereby the valve may directly communicate said suction pipe to said suction line and pump to increase the vacuum in the tank when the mud level is falling and whereby the valve may communicate said suction pipe through said port means with the atmosphere to decrease the vacuum in the tank when the mud level rises.

2. The apparatus as defined in claim 1 together with a liquid trap interposed in said suction line between said control valve and said vacuum pump, a drain pipe extending from said trap into said vacuum tank whereby liquid collecting in the trap may be automatically drained by a vacuum differential between the tank and the suction line when said pump is inoperative, and a check valve provided in said drain pipe for permitting flow from the trap to the tank only.

3. In a drilling mud de-gassing apparatus, the combination of a horizontally elongated vacuum tank having an inlet end and an outlet end, an intake pipe for gas cut mud extending into the inlet end of said tank, an outlet pipe for gas free mud extending from the bottom portion of the tank outwardly through the outlet end thereof for recirculation of gas free mud to a well, a vacuum pump, a suction line extending from said pump, a three-way vacuum control valve having a first port connected to said suction line, a second port, and port means communicating with the atmosphere, a suction pipe extending from said second port of said valve to the interior of said tank, a float buoyant on the level of mud in the bottom portion of the tank, and means operatively connecting said float to said control valve whereby the valve may directly communicate said suction pipe to said suction line and pump to increase the vacuum in the tank when the mud level is falling and whereby the valve may communicate said suction pipe through said port means with the atmosphere to decrease the vacuum in the tank when the mud level rises.

References Cited

UNITED STATES PATENTS

| | | | |
|---|---|---|---|
| 700,068 | 5/1902 | Morison | 55—170 |
| 1,569,105 | 1/1926 | West | 55—192 |
| 2,779,503 | 1/1957 | Wright et al. | 55—169 X |
| 2,869,673 | 1/1959 | Erwin | 55—192 |

REUBEN FRIEDMAN, *Primary Examiner.*

J. ADEE, *Assistant Examiner.*